(No Model.)

J. D. BENSON.
MICROMETER SCALE.

No. 527,581. Patented Oct. 16, 1894.

Witnesses
A. J. Tayuser
M. L. Hinchliffe

Inventor
John D. Benson
By his atty.
Geo. D. Phillips

UNITED STATES PATENT OFFICE.

JOHN D. BENSON, OF BROOKLYN, NEW YORK.

MICROMETER-SCALE.

SPECIFICATION forming part of Letters Patent No. 527,581, dated October 16, 1894.

Application filed December 27, 1892. Serial No. 456,330. (No model.)

*To all whom it may concern:*

Be it known that I, JOHN D. BENSON, a citizen of the United States, residing at Brooklyn, in the county of Kings and State of New York, have invented certain new and useful Improvements in Micrometer-Scales; and I do hereby declare the following to be a full, clear, and exact description of the invention, such as will enable others skilled in the art to which it appertains to make and use the same.

My invention relates to instruments of precision and resides essentially in a measuring scale adapted in use to be employed in obtaining a quick and accurate reading of short distances or diameters.

To this end my invention is what may properly be termed a micrometer scale as it is capable by reason of its peculiar construction of a close and easy reading of fractional parts of an inch, and consists of a scale having one of its edges straight and the other or opposite edge tapered, or at such an angle thereto that lines projected at right angles to the straight edge will vary in their length proportionate to such taper. The edge referred to as straight, is perpendicular or at right angles to a true vertical line when such edge is arranged in a true horizontal plane, and the tapering edge is arranged at an incline or angle to such straight edge, so that the figure of the scale in its preferred form is a truncated right angled triangle, the straight edge representing the base or perpendicular and the tapered or inclined edge representing the hypotenuse; but for conciseness, I herein refer to the former simply as the straight edge and the latter as the tapered or inclined edge, all of which improvements will be more fully set forth in the following specification and such characteristic features as I believe to be new and novel particularly pointed out in the claims to follow.

To properly understand my invention reference is had to the accompanying drawings and to the letters of reference marked thereon, which form part of my specification.

Figure 1:
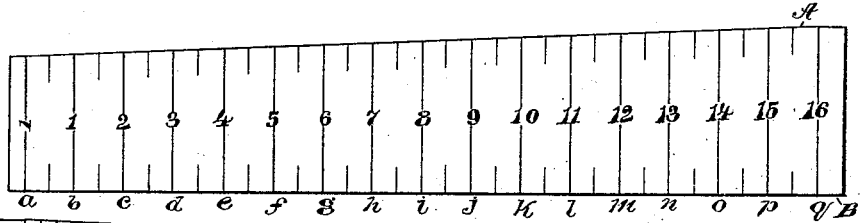
Figure 2:
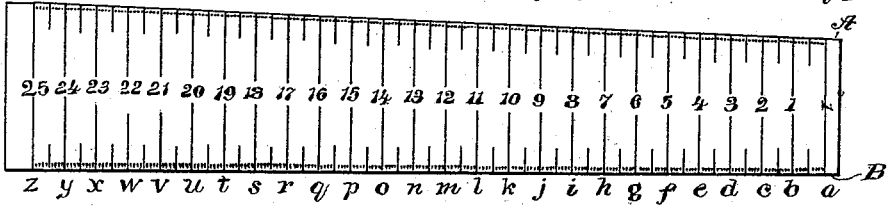
Figure 3:
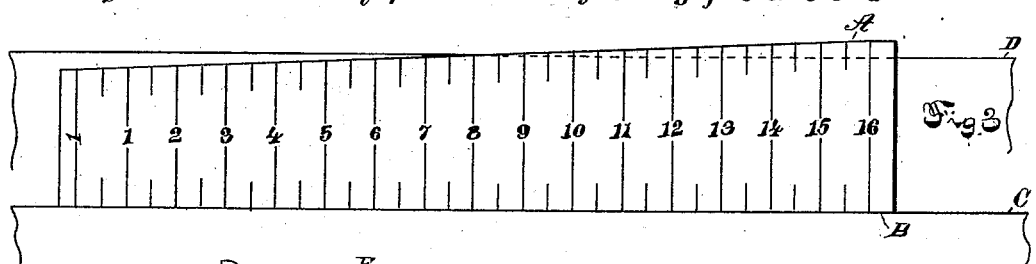
Figure 4:
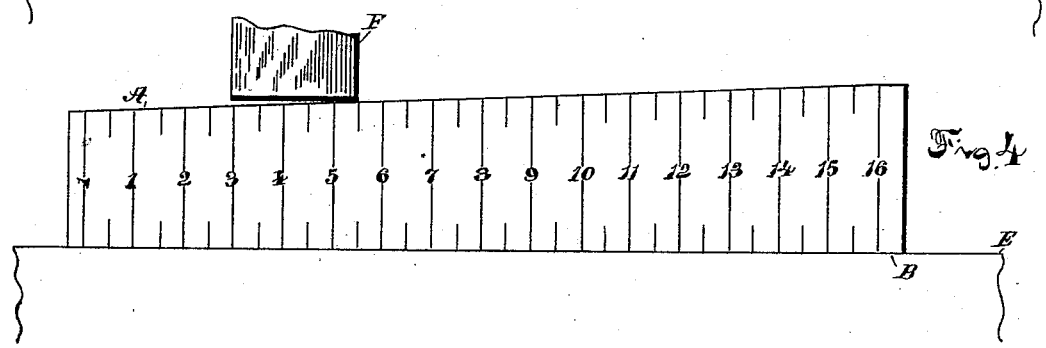
Figure 5:
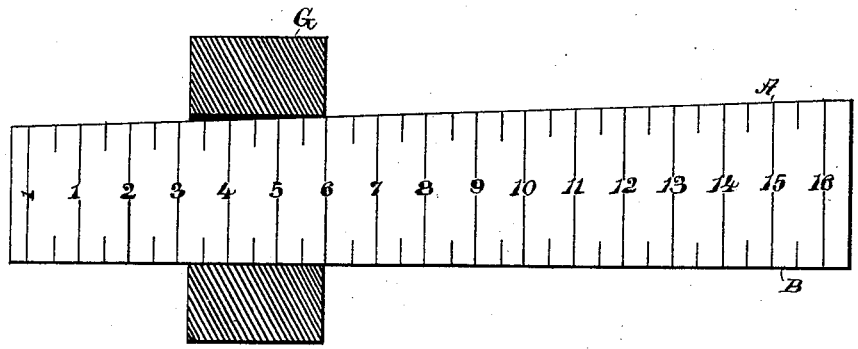
Figures 6, 7:
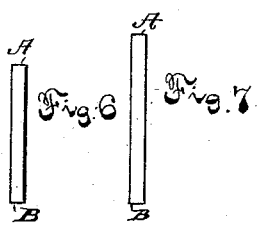

Figure 1, represents an elevation of one side of the scale with graduating lines thereon varying by sixty-fourths and fractional parts of the same. Fig. 2, is a reverse side of such scale showing finer graduations varying by hundredths and fractional parts of the same in thousandths. Fig. 3 represents such scale in use for obtaining an outside measurement. Fig. 4, shows the manner of using the scale when measuring between two fixed points. Fig. 5, represents a sectional view of a shell with the scale inserted into the hole thereof for measuring its diameter. Figs. 6 and 7 represent end elevations of the scale.

Its construction and operation are as follows:

A represents the taper edge and B the straight edge of the scale. *a* is a line representing in its length a certain unit of measurement according to the width of the scale at its narrowest point, while the other lines *b*, *c*, *d*, *e*, &c., vary in their length in accordance with their number and the angle or taper of the line A. The intermediate short lines, placed between the long lines, represent fractional parts of such long lines and such lines may if required, extend across the face of the scale as well.

Referring to Fig. 1, the first line *a* represents in its length from the straight to the taper edge, one inch, and as there are sixteen lines set at equal distances apart, viz: from *b* to *q* and the taper of the line A is one half inch to the foot, which in the six inch scale shown would be one quarter inch taper in its length, therefore, these long lines would vary from line *a* by sixty-fourths. As before mentioned, line *a* represents one inch; line *b* which is also marked *l*, would indicate one inch and one sixty fourth of an inch; line *c*, one inch and two sixty-fourths; line *d* one inch and three-sixty-fourths, and so on to the last line *q*, which would represent one inch and sixteen sixty-fourths; or in other words an inch and a quarter. The short lines placed half way between the long lines *a*, *b*, *c* and *d*, would, by reason of their being placed one half of such distance, represent one half of one sixty-fourth or one one-hundred-and-twenty-eighth of an inch.

On the reverse side of the scale shown in Fig. 2 are still finer graduations by reason of the fact that the distance from line *a* to *z* representing six inches, is divided into twenty-five parts, so that these long lines will vary by hundredths, and the next longest lines by (.005) half hundredths of an inch, while the shortest lines or dots would represent (.001) thousandths each. The advantage of this arrangement of different graduations on either side of the scale will readily be seen in measuring any distance within the limit of the scale, such for instance as the diameter of a hole or slot, or the distance between two fixed points, wherein the reading is instantly given in sixty fourths or fractional parts of the same upon one side, and upon the other, the equivalent of sixty-fourths in thousandths; or, if an exact reading cannot be obtained on the side having the coarser graduations, it will be found on the reverse side having the finer graduations.

It will readily be understood that the metric system or other fractional parts of an inch may be used besides those shown.

In Fig. 3 the scale is applied in determining the distance between the line C, which line represents a ledge or projection to the top thereof which is represented by line D. The distance as represented by the scale is one inch and eight sixty-fourths, ($1\tfrac{8}{64}$) of an inch. So also in Fig. 4, the distance from the surface E to the projection F as represented on the scale is one inch and five sixty-fourths and one half of a sixty-fourth (1.0234). In Fig. 5 the diameter of the whole in shell G is as shown by the scale one inch and six sixty-fourths ($1\tfrac{6}{64}$) of an inch.

These scales may be of any length, width or taper required and may also be made in sets. As before mentioned, the taper represented is one half of an inch to the foot and six inches long. This length is calculated to be most convenient and handy for general use. Therefore, in making the next scale of the set below the size shown, the initial measuring line $a$ would be three quarters of an inch in length and the longest line $q$, one inch long. In this way the first scale of the set or series would represent at the widest end one quarter of an inch, and taper to a point at the narrowest end. The same rule would of course apply in continuing the set above the size shown in the accompanying drawings.

While the edges A and B of the scales may be made straight or square, I prefer in order to determine the diameter of a hole to make such edges rounding, as shown in Figs. 6 and 7, in which case each graduated line could represent the diameter of a circle of which the circular edge of the scale would represent a portion of the arc thereof. In this way the edge of the scale would exactly coincide with the circle of the hole.

From the foregoing, it will readily be seen that this instrument is better adapted for obtaining a quick and accurate measurement in places not applicable to the ordinary scale or rule, or even where the micrometer or vernier caliper cannot be used to advantage. It will readily be understood also that these scales are not used in the same manner as the ordinary rule but that measurements are taken at right angles thereto.

Having thus described my invention, what I claim as new, and desire to secure by Letters Patent, is—

1. As an improved article of manufacture, a micrometer scale for obtaining exact measurements from a level surface in units of the selected system and fractional parts of such units, said scale having one of its edges perfectly straight or level and perpendicular to a vertical line when laid down horizontally and the other or opposite edge inclined to the straight edge in a fixed proportion, the scale being supplied with a main series of transverse graduations representing divisions of a given unit in proportion to the inclination of the inclined edge, and a secondary series of intermediate graduations representing fractional parts thereof, the various graduation lines being at uniform distances apart in their respective series, and representing different fixed distances or lengths between the straight and inclined edges of the scale, the measurements being ascertained by applying the scale edgewise between the points the distance between which it is desired to obtain, and reading the nearest main graduation and the nearest secondary graduation with relation to the main graduation, substantially as described.

2. A micrometer scale for obtaining exact measurements from a level surface in units of the selected system and fractional parts of such units, said scale having one of its edges perfectly straight or level and perpendicular to a vertical line when laid down horizontally, and the other or opposite edge inclined to the straight edge in a fixed proportion, the scale being supplied with a main series of transverse graduations representing divisions of a given unit in proportion to the inclination of the inclined edge, and a secondary series of intermediate graduations representing fractional parts thereof, the various graduation lines being at uniform distances apart in their respective series, and representing different fixed distances or lengths between the straight and inclined edges of the scale, the measurements being ascertained by applying the scale edgewise between the points the distance between which it is desired to obtain, and reading the nearest main graduation and the nearest secondary graduation with relation to the main graduation, the straight and inclined edges of the scale being curved on substantially the arcs of the circles whose diameters are represented by the graduations, substantially as described.

3. A micrometer scale for obtaining exact measurements from a level surface in units of the selected system and fractional parts of such units, said scale having one of its edges perfectly straight or level and perpendicular to a vertical line when laid down horizontally and the other or opposite edge inclined to the straight edge in a fixed proportion, the scale being supplied with a main series of transverse graduations representing divisions of a given unit in proportion to the inclination of the inclined edge, and a secondary series of graduations representing fractional parts thereof, the various graduation lines being at uniform distances apart in their respective series, and representing different fixed distances or lengths between the straight and inclined edges of the scale, the measurements being ascertained by applying the scale edgewise between the points the distance between which it is desired to obtain, and reading the nearest main graduation and the nearest secondary graduation with relation to the main graduation, opposite sides of the scale having main and secondary graduation lines representing various parts or fractions of the selected unit of measurement, substantially as described.

In testimony whereof I affix my signature in presence of two witnesses.

JOHN D. BENSON.

Witnesses:
E. B. WASHBURN,
LEONARD N. VAUGHAN.